US007079528B2

(12) United States Patent
Ziegler et al.

(10) Patent No.: US 7,079,528 B2
(45) Date of Patent: Jul. 18, 2006

(54) DATA COMMUNICATION METHOD

(75) Inventors: Frederick J. Ziegler, Rochester, MN (US); Mark J. Hickey, Rochester, MN (US); Jack C. Randolph, Rochester, MN (US); Susan M. Cox, Rochester, MN (US); Dale J. Thomforde, Pine Island, MN (US); Robert N. Newshutz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 10/022,020

(22) Filed: Dec. 13, 2001

(65) Prior Publication Data

US 2003/0112798 A1  Jun. 19, 2003

(51) Int. Cl.
*H04L 12/66* (2006.01)
(52) U.S. Cl. ............ 370/352; 370/365; 370/366; 370/535; 370/539; 341/100; 341/101
(58) Field of Classification Search .......... 370/366, 370/351, 535, 539, 352, 365; 341/100, 101
See application file for complete search history.

(56) References Cited

U.S. PATENT DOCUMENTS

| | | | | |
|---|---|---|---|---|
| 6,333,938 B1* | 12/2001 | Baker | .................. | 370/503 |
| 6,347,098 B1* | 2/2002 | Ejiri | .................. | 370/532 |
| 2003/0074629 A1* | 4/2003 | Levin | .................. | 714/800 |
| 2005/0047392 A1* | 3/2005 | Ashwood | .................. | 370/351 |

* cited by examiner

*Primary Examiner*—Dang Ton
*Assistant Examiner*—Inder Pal Mehra
(74) *Attorney, Agent, or Firm*—Bockhop & Associates LLC

(57) ABSTRACT

In a method of communicating a plurality of parallel data packets from a first data parallel bus to a second parallel data bus, each of the plurality of parallel data packets is separated into a first portion and a second portion. Each first portion is converted into a first serial data stream and each second portion is converted into a second serial data stream. The first serial data stream is transmitted over a first serial data channel and the second serial data stream is transmitted over a second serial data channel. The first serial data stream is converted into a plurality of first received portions and the second serial data stream is converted into a plurality of second received portions. Selected first received portions are combined with corresponding selected second received portions so as to regenerate the plurality of parallel data packets.

22 Claims, 2 Drawing Sheets

DATA COMMUNICATION METHOD

BACKGROUND OF THE INVENTION

1. Field of the Invention

The present invention relates to computers and, more specifically, to a method for high speed data communications.

2. Description of the Prior Art

Computers communicate using either serial data transmission or parallel data transmission. In serial data transmission, individual bits of data are transferred over a wire, one at a time. Parallel data transmission occurs when several bits are transmitted simultaneously, each along its own separate channel. If eight bits represent a data word being transmitted, then there must be at least eight distinct channels between the sender and receiver, plus as many additional channels as are required for control information. Although parallel transmission is universal within the computer for high speed data transfers on various buses, it is rare in environments outside that of the internal computer structure and connections between the computer ands close peripherals.

In parallel transmission all the bits in a data word are transmitted along separate channels simultaneously. However, due to natural aberrations in the structure of each line (e.g. resistance), the signals do not arrive at the receiver at the same time. This problem is known as "skew," which increases in severity as the distance between sender and receiver grows larger. The difficulties encountered when implementing parallel transmission over long distances can be eliminated by using serial data transmission. The source of the problems in parallel transfers is the use of multiple lines to transmit data bits simultaneously. However, with the serial approach this does not occur as just a single line is used and the bits, comprising a data word, are sent one bit at a time. Serial transmission offers several advantages, including a savings in cost——only one data channel is needed instead of several—and the problem of skewing does not arise.

One major difficulty in data transmission is that of synchronizing the receiver with the sender. This is particularly true in serial data transfer, where the receiver must be able to detect the beginning of each new character in the bit stream being presented to it. If the receiver is unable to achieve this, it will not be able to interpret the incoming bit stream correctly. Two approaches are used to solve the problem of synchronisation: asynchronous transmission and synchronous transmission.

Using the asynchronous transmission approach, synchronisation is implemented at character level and each individual character is transmitted along with the necessary control information to allow this to take place. The control information consists of additional bits added to each character: "start bits" that indicate that transmission is about to commence, and "stop bits" that indicate that transmission is about to cease. Asynchronous transmission has several advantages. For example, each individual character is complete in itself. If a character is corrupted during transmission, its successor and predecessor will be unaffected. However, a high proportion of the transmitted bits are used uniquely for control purposes and thus carry no useful information. Also, because of distortion, the speed of transmission is limited. Therefore, asynchronous serial transmission is normally used only for transmission speeds of up to 3000 bits per second, with only simple, single-character error detection.

The synchronous transmission approach again transmits the message via a single channel. However, in this instance there is no control information associated with individual characters. Instead, the characters are grouped together in blocks of some fixed size and each block transmitted is preceded by one or more special synchronisation characters, which can be recognized by the receiver. With the synchronous approach, the amount of central information that must be transmitted is restricted to only a few characters at the start of each block. The system is not so prone to distortion as asynchronous communication and can thus be used at higher speeds. Therefore, serial synchronous transmission is principally used for high-speed communication between computers.

Many computers communicate with other computers using parallel data transmission protocols. Wired parallel data busses have a limited length over which the data can be transmitted. However, modem computer communications often require computers to communicate over ever increasing distances. One approach to allowing longer distance communications is to convert parallel data to a serial data stream, that is then transmitted over an optical transmission channel. However, serializing parallel data and then transmitting it over a serial optical transmission channel may limit the data transfer rate if the serial optical transmission channel lacks sufficient bandwidth to transmit all of the parallel data at a rate as fast as the data transmission on the parallel data busses.

Therefore, there is a need for a parallel-to-serial-to-parallel data transmission system that employs more than one serial data channel to transmit data.

SUMMARY OF THE INVENTION

The disadvantages of the prior art are overcome by the present invention which, in one aspect, is a method of communicating a plurality of parallel data packets from a first data parallel bus to a second parallel data bus. Each of the plurality of parallel data packets is separated into a first portion and a second portion. Each first portion is converted into a first serial data stream and each second portion is converted into a second serial data stream. The first serial data stream is transmitted over a first serial data channel and the second serial data stream is transmitted over a second serial data channel. The first serial data stream is converted into a plurality of first received portions and the second serial data stream is converted into a plurality of second received portions. Selected first received portions are combined with corresponding selected second received portions so as to regenerate the plurality of parallel data packets.

In another aspect, the invention is an apparatus for transmitting a plurality of data words from a first parallel data bus to a second parallel data bus that includes a first serializer, a second serializer, a first serial data channel, a second serial data channel, a first de-serializer, a second de-serializer and a receiver element. The first serializer is in data communication with the first parallel bus and transforms a first portion of each data word into a first serial data stream. The second serializer is in data communication with the second parallel bus and transforms a second portion, different from the first portion, of each data word into a second serial data stream. The first serial data channel is in data communication with the first serializer and transmits the first serial data stream. The second serial data channel is in data communication with the second serializer and transmits the second serial data stream. The first de-serializer, which is in data communication with the first serial data channel, transforms the first serial data stream into a plurality of first parallel data units. Each first parallel data unit is identical to a corresponding first portion of a data word. The second de-serializer, which is in data communication with the second serial data channel, transforms the second serial data stream into a plurality of second parallel data units. Each second parallel data unit is identical to a corresponding second portion of a data word. The receiver element receives the first parallel data units from the first de-serializer and the second parallel data units from the second de-serializer. The receiver element also assembles corresponding ones of the first parallel data units and the second parallel data units into corresponding data words and transmits the corresponding data words to the second parallel data bus.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
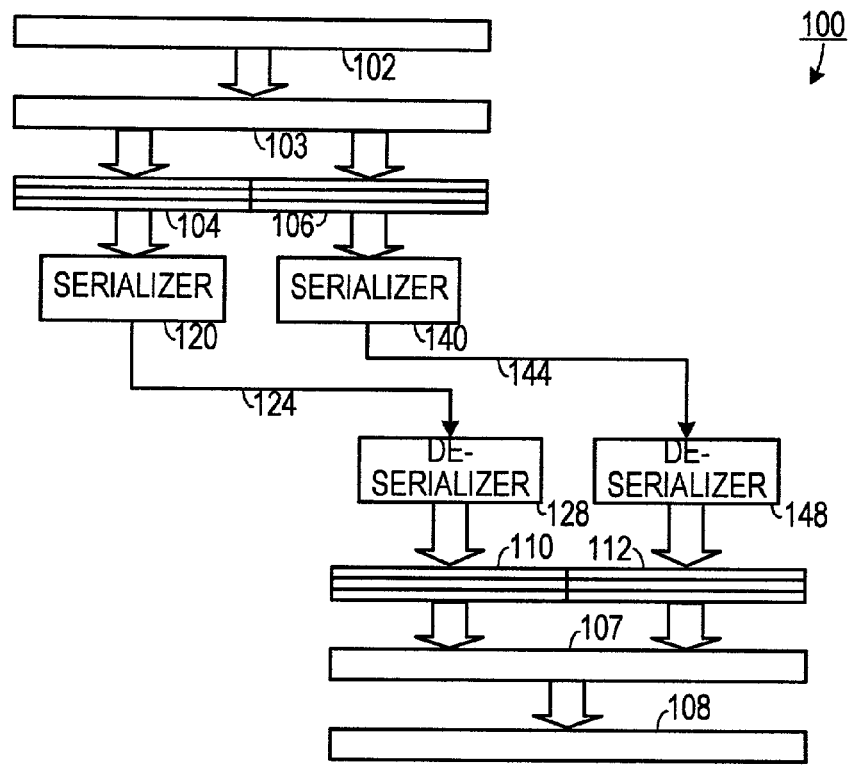
FIG. 1 is a conceptual diagram of one illustrative embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, in one embodiment of a data communication system 100, according to the invention, data is transferred from a first parallel data bus 102 to a second parallel data bus 108 via a first serial data channel 124 and a second serial data channel 144. A logic element 103 contains receiver logic to receive data from the first parallel data bus 102, splitting logic to split the incoming parallel data bus 102 data into two parallel data buses 104 and 106, and transmit logic to transmit the data to the split parallel data buses 104 and 106. In this embodiment, each word from the first parallel data bus 102 is split in the logic element 103 into a first half-word and a second half-word. The first half-word 104 is delivered to a first serializer 120, which turns the parallel data of the first half-word 104 in to a first serial data stream. The first serial data stream is then transmitted via the first serial data channel 124. Similarly, the data of the second half-word 106 is serialized by a second serializer 140 and transmitted as a second serial data stream onto the second serial data channel 144. The first serial data channel 124 and the second serial data channel 144 are typically high speed serial data channels, such as optical fibers. While only two half-word divisions of the first parallel data bus 102 are shown, it is readily apparent that any number of divisions of data are possible. For example, the parallel data could be divided into quarter-words, serialized and then transmitted on four serial data channels. It is intended that all such variations fall within the scope of the claims below.

The first serial data stream received from the first serial data channel 124 is converted back to a plurality of parallel half-words 110 by a first de-serializer 128 and the second serial data stream received from the second serial data channel 144 is de-serialized by a second de-serializer 148 into a second plurality of half-words 112. A second logic element 107 includes receiver logic to receive both the first and second half-words 110 and 112, recombining logic to recombine the first plurality of half words 110 with the corresponding second plurality of half-words 112 and transmit logic to transmit the recombined data to the second parallel data bus 108. One suitable example of a device that may be used as both a serializer and a de-serializer is the SerDes (part no. HDMP 2631) available from Agilent Technologies.

Figure 2:
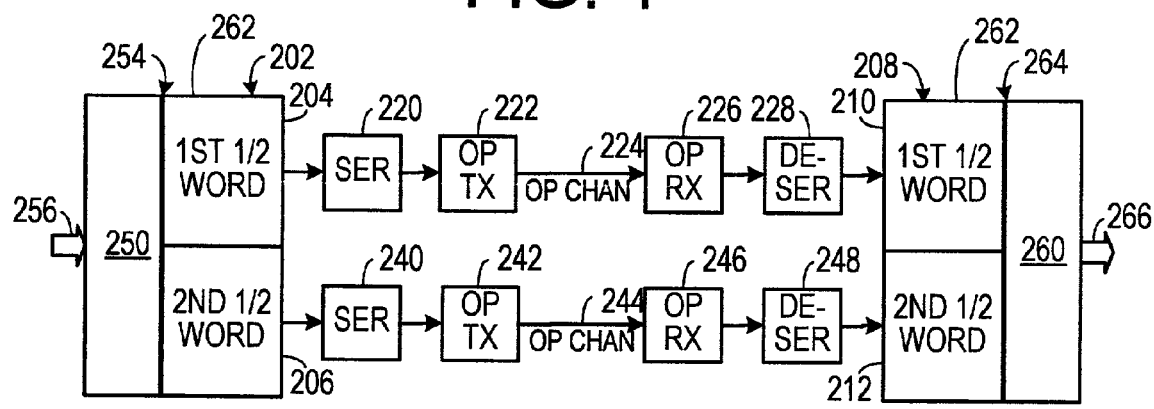
FIG. 2 is a schematic diagram of one implementation of the embodiment shown in FIG. 1.

An optical channel embodiment of the invention is shown in FIG. 2. In this embodiment, data from the first parallel data bus 256, is received by an electrical receiver logic element 250 and passed through an asynchronous FIFO. The first parallel data bus 256 and the electrical receiver logic 250 on the write side of the asynchronous FIFO are controlled by a clock provided with the incoming first parallel data bus 256. The electrical receiver logic 250 and an optical transmitter logic element 252 (which still comprises an electrical circuit) on the read side of the asynchronous FIFO are controlled by a clock provided by an on-card reference oscillator. The link data rate is higher than the first parallel data bus 256 data rate to allow the inclusion of special "start," "stop," "sync" and other special half-word character pairs that may be included in the parallel datastream. The optical transmitter logic 252 divides the new parallel datastream into first half-words 204 and second half-words 206, which are then serialized by a first serializer 220 and a second serializer 240, respectively. The output of the first serializer 220 is transformed into an optical signal by a first optical transmitter 222 and transmitted on a first optical fiber data channel 224. The output of the second serializer 240 is transformed into an optical signal by a second optical transmitter 242 and transmitted on a second optical fiber data channel 244. The signal from the first optical fiber data channel 224 is received by a first optical receiver 226, which transforms the signal into a first electrical serial data signal. Similarly, the signal from the second optical fiber data channel 244 is received by a second optical receiver 246, which transforms the signal into a second electrical serial data signal. The first electrical serial data signal is de-serialized by a first de-serializer 228 and the second electrical serial data signal is de-serialized by a second de-serializer 248. The now parallel data from the first de-serializer 228 is the first half-word 210. Similarly, the now parallel data from the second de-serializer 248 is the second half-word 212. The de-serializers 228 and 248 also have logic to extract a clock from the datastream that matches the frequency of the parallel output data. The first de-serializer 228 will extract a first clock from the first electrical serial data signal and pass it with the first half-words 210 to the optical receiver logic 262. The second de-serializer 248 will extract a second clock from the second electrical serial data signal and pass it with the second half-words 212 to the optical receiver logic 262. The half-word data streams 210 and 212 are received by the optical receiver logic and passed through several asynchronous FIFO's. The two half-words are stripped of any additional special characters and recombined into one datastream that the electrical transmitter logic 260 converts into the second parallel data bus 266. The first half-word 210 and second half-word 212 and the optical receiver logic 262 on the write side of the first asynchronous FIFO are controlled by the extracted first clock provided with the incoming first half-word 210 or the extracted second clock provided with the incoming second half-word 212.

The internal data and optical receiver logic 262 and the electrical transmitter logic 260 on the read side of the last asynchronous FIFO are controlled by a clock matching the frequency of the first parallel data bus on that system. It should be recognized that FIG. 2 shows transmission of data from a first computer system 254 to a second computer system 264. For a fill communications link, data must also be transmitted from computer system 264 to computer system 254. To accomplish this, the apparatus shown in FIG. 2. is essentially copied and flipped so that data flows in the opposite direction.

Figure 3:
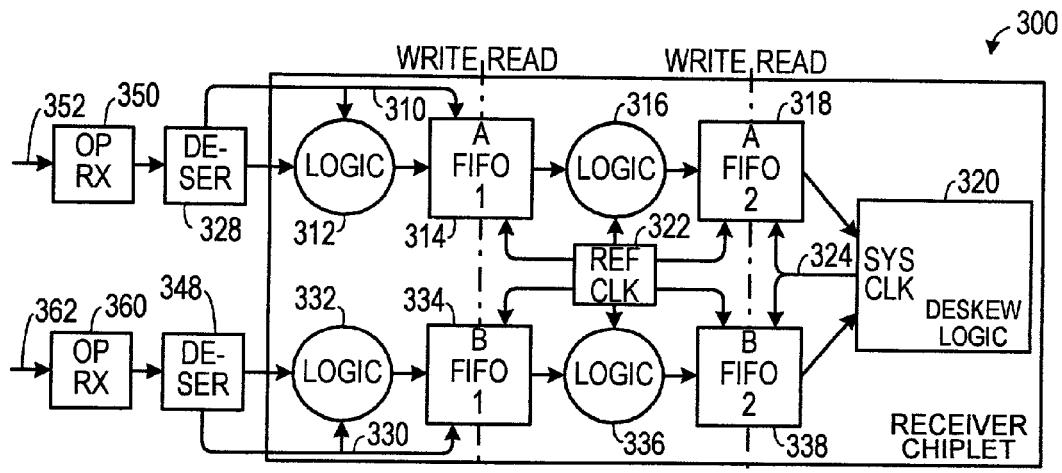
FIG. 3 is a schematic diagram of one embodiment of an optical receiver logic circuit according to one embodiment of the invention.
Figure 4:
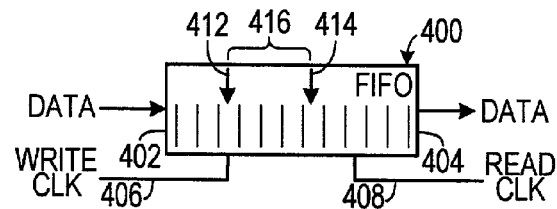
FIG. 4 is a schematic diagram of a FIFO used in one embodiment of the invention.

One embodiment of a parallel data reassembly receiver 300 is shown in FIG. 3. This embodiment employs a plurality of FIFO's (first-in, first-out queues) 314, 318, 334 and 338 to reassemble the parallel half-word data. As shown in FIG. 4, each FIFO 400 has a write side 402, which accepts data written to the FIFO 400, and a read side 404, which sends data out of the FIFO 400. The write side 402 is gated by a write clock 406 and the read side is gated by a read clock 408. A write pointer 412 keeps track of the next position available for writing to the FIFO 400 and a read pointer 414 keeps track of the next position to be read from the FIFO 400. The distance 416 between the write pointer 412 and the read pointer 414 provides an indication of the fullness of the FIFO 400.

Returning to FIG. 3, half-word parallel data is received from the first de-serializer 328 and the second de-serializer 348. The parallel half-words from the first de-serializer 328 are gated into the write side of a FIFO, designated A-FIFO-1 314, by a first A-side logic element 312. The first A-side logic element 312 and the write side of A-FIFO-1 314 are both clocked by the same clock 310 that is extracted from the first de-serializer 328. Similarly, the parallel half-words from the second de-serializer 348 are gated into the write side of a FIFO, designated B-FIFO-1 334, by a first B-side logic element 332. The first B-side logic element 332 and the write side of B-FIFO-1 334 are both clocked by the same clock 330 that is extracted from the first de-serializer 348.

Unlike the write sides of A-FIFO-1 314 and B-FIFO-1 334, which are each gated by different clocks to allow for the independent writing of data from the de-serializers 328 and 348, the read sides of A-FIFO-1 314 and B-FIFO-1 334 are both gated by a common reference clock 322. The purpose of having two serial FIFO's (i.e., 314 and 318 or 334 and 338) is to provide noise immunity from the extracted clocks 310 and 330 from the de-serializers 328 and 348 by minimizing the use of these clocks (i.e., minimizing logic elements 312 and 332). The operation of this embodiment can be done with one serial FIFO where the write side is controlled by the extracted de-serializer clocks 310 and 330 and the read side is controlled by the system clock 324. In this embodiment, the frequency of the de-serializer extracted clocks 310 and 330 in normal operation should match, within an allowable tolerance, the frequency of the reference clock 322. The FIFO-1 write and read logic in logic elements 312, 332, 316 and 336 accomplish required adjustments of the FIFO read and write pointers, but do not otherwise modify their respective datastreams. The FIFO-2 write logic in logic elements 316 and 336 strip out the extra special half-word characters ("start," "stop," "sync," etc.) upon writing to A-FIFO-2 318 and B-FIFO-2 338, instead adding a set of flags coincident with the data to denote syncs, first-of-packet, last-of-packet, and so on.

Data from the read sides of A-FIFO-2 318 and B-FIFO-2 338 is transferred to a de-skewing logic element 320. The read sides of A-FIFO-2 318 and B-FIFO-2 338 are clocked by the same clock as the de-skewing logic element 320. The de-skewing logic element 320 adjusts the alignment of the parallel data half-words, which may be out of alignment as a result of the differences between the lengths of fibers 352 and 362, clock tolerances of the extracted clocks 310 and 330 and tolerances of all the electrical and optical components encountered on the path after the data is originally split in the optical transmitter logic. The de-skewing logic 320 then passes the newly recombined data to the electrical transmitter logic.

As discussed in reference to FIG. 4, each of the FIFO's include a FIFO fullness indicator 416 which is derived from the distance between the write pointer 412 and the read pointer 414. The system needs to respond appropriately when the FIFO fullness is greater than a first predetermined threshold, or in other words when the FIFO is getting too close to being full. Similarly, the system needs to respond appropriately when the FIFO fullness indicator 416 indicates that the FIFO fullness is less than a second predetermined threshold, or in other words, when the FIFO is too close to being empty. This embodiment includes an asynchronous FIFO in the electrical receiver logic and four asynchronous FIFO's in the optical receiver logic. The electrical receiver logic FIFO is controlled by clocks such that the write data rate is much slower than the read frequency. This FIFO can never get full. If it approaches an empty state, dual special "fill" half-word characters are inserted into the datastream, so that this cycle of dummy "fill" data will be transmitted through both optical fibers, thus maintaining the skew relationship between the two fibers. This embodiment has the ability to add "fill" characters anywhere, whether inside a data packet, or during an idle stream. Since they are unique characters, they can are detected and extracted later. The optical receiver logic FIFO's need to operate in pairs to minimize any additional skew between the A and B datastreams. A-FIFO-2 318 and B-FIFO-2 338 are controlled by clocks such that the effective read frequency is faster than the effective write data rate, taking into consideration that the special additional half-word characters are not being written. This FIFO can never get full. If it gets empty, the read logic pauses between packets. Analysis of the clock tolerances and maximum packet lengths leads to a maximum allowable number of consecutive special "fill" half-word characters for a given embodiment.

Since A-FIFO-2 318 and B-FIFO-2 338 are controlled both by the same reference clock 322 on the write side, and again by the same system clock 324 on the read side, both will act in a coordinated way during normal operation, thus no additional skew is added. A-FIFO-1 314 and B-FIFO-1 334 are controlled by clocks 310 and 330 extracted by the de-serializers 328 and 348, and by the reference clock 322, which are all the same frequency (within their tolerances) during normal operation. (The exact frequency and phase may vary one to the other). Over time these FIFO's may become either full or empty. When the FIFO fullness indicator indicates A-FIFO-1 314 is nearing being full, the optical receiver logic 312 will simply ignore, or consume of the special "fill" half-word characters. In this embodiment, it is important to consume only one "fill" half-word character because B-FIFO-1 334 may not be near full and may not need to consume a character. In such a case the system may add one cycle of misalignment to one datastream with respect to the other datastream. The de-skew logic 320 is able to handle this one cycle. Similarly, B-FIFO-1 334 may consume a "fill" half-word character while A-FIFO-1 does not. Again, only one additional cycle of misalignment will occur. Since the extracted clocks 310 and 330 are extracted from the data-streams that originally were transmitted by the optical transmitter logic 252 using the same clock, the extracted clocks 310 and 330 should track each other, or both trend fast together or slow together during normal operation. On the other hand, when the FIFO fullness indicator indicates that either A-FIFO-1 314 or B-FIFO-1 334 is near to being empty, the logic elements in the optical receiver logic elements 316 and 336 will both pause reading the FIFO's and generate a special "pad" half-word character (which is a unique character to that may aid in the debug phase of development). Since this is generated on both data streams, no additional misalignment is incurred. Like the other additional special half-word characters, this will not be written to A-FIFO-2 318 or B-FIFO-2 338.

The above description focuses on normal operation. During abnormal system conditions, the system will detect and recover from a variety of errors. The electrical receiver logic 250 has three main error detection scenarios: training sequence timeout, bad system clocks, and FIFO errors. This embodiment self-initializes at system power-on when there may already be bus traffic on the first parallel data bus 256. Training sequences, which come at guaranteed minimum intervals of time, are used to establish a known starting point in the data flow. A time-out mechanism exists after the electrical receiver logic FIFO (and so on a more trusted clock) to detect when the time between training sequences exceeds a predetermined minimum time. Detection of this error is passed to the optical receive logic as well. Secondly, the clock which comes coincident with the first parallel data bus 256 is subject to disruption during system initialization and re-initialization. Again, the FIFO read-side clock is used to monitor this incoming clock and detect a bad system clock. Detection of this error is passed to the optical receive logic as well. Thirdly, the FIFO's have a write-error signal that indicates that an attempt was made to write an already full FIFO, and a read-error signal that indicates that an attempt was made to read an already empty FIFO. When any of these three error scenarios are detected by the electrical receiver logic 250, the FIFO read logic stops reading from the FIFO, the FIFO write logic stops writing to the FIFO, the FIFO is reinitialized and dual special "fill" half-word characters are sent to the optical transmitter logic 252. The higher-level elements of the system architecture or the computer system 264 will detect this as an error and will begin a system-level data retry routine, of the type commonly known to the art of computer communications.

The optical receiver logic 262 has several error detection scenarios, including: internal invalid states, loss of optical signal, signal loss on the de-serializer, clock-frequency errors, errors on the optical interface, and indication from the electrical receiver logic 250. The optical receiver logic 262 includes seven state machines, allowing any invalid state to be detected and recovered therefrom. The optical receiver logic 262 receives indicator signals from the optical receivers 226 and 246 and from the de-serializers 228 and 248 which indicates loss of signals (which is important when a design restraint requires that the signal is maintained continuously and that idle signals are sent if no data is present). These indicator signals are typically delayed from the actual event, hence clock-frequency errors must be detected directly by the optical receiver logic 262. If one or both of the de-serializer extracted clocks 310 and 330 are out of specification, it is unlikely they will match and the two data streams will become further out of alignment with respect to each other, and proper recombination will be unlikely. Extracted clocks 310 or 330 that are too fast will quickly fill up A-FIFO-1 314 or B-FIFO-1 334, and the FIFO write-error signal(s) will be asserted. If either of the extracted clocks 310 or 330 are too slow, A-FIFO-1 314 or B-FIFO-1 334 will empty too quickly and the FIFO read-error signal(s) will be asserted.

Figure 5:
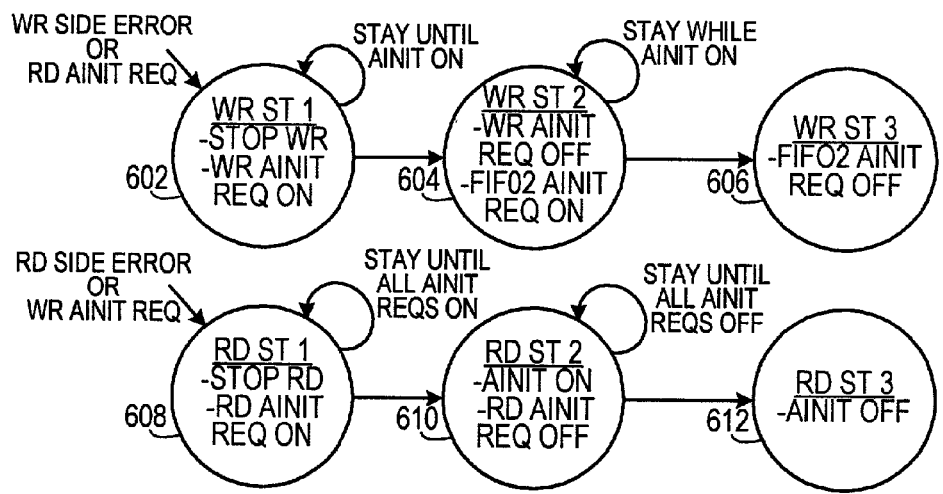
FIG. 5 is a diagram showing several error recovery states employed in one embodiment of the invention.

The system must also cover the scenario where the FIFO's are cleared slightly before an error event ends. In this case, some misalignment between the A and B data streams may exist. That is, some extra erroneous data may exist in A-FIFO-1 314 with respect to B-FIFO-1 334 (or vice versa), but not sufficient data to trigger either the write-error or read-error signals. The optical receiver de-skew logic 320 detects this error by demanding that the special flags, derived from the special half-word characters, come in matching sets from A-FIFO-2 318 and B-FIFO-2 338 (e.g., both "syncs" or both "first-of-packet" or both "last-of-packet"). Any mismatched pairs indicate an error. This is noteworthy since single serial channel links cannot do this important level of checking. Errors on the optical interface refers to detecting "last-of-packet" pairs that were not preceded by any "first-of-packet" pairs of special flags, or "first-of-packet" pairs of special flags with no subsequent "last-of-packet" pairs of special flags within 560 bytes, or certain special characters that cannot randomly appear in the original datastream after the conversion, not previously noted, from 8 bit encoding to 10 bit encoding, per the ANSI X3.230-1994-FC-PH Fibre channel standards. At the transmit side, a circuit element periodically and contemporaneously adds to both the first serial data stream and the second serial data stream an alignment character. The alignment character could be, for example, a sync character, a start character or an end character When the optical receiver logic 262 detects an error, it recovers in the following manner: FIG. 5 shows an embodiment of the three error recovery states, 602, 604, and 606 in the state machines for the FIFO write controlling logic 312, 332, 316 and 336 that respectively control the writing of A-FIFO-1 314, B-FIFO-1 334, A-FIFO-2 318 and B-FIFO-2 338. Also shown are the three error recovery states, 608, 610 and 612 in the state machines for the FIFO read controlling logic 316, 336 and 320 which respectively control the reading of A-FIFO-1 314, B-FIFO-1 334, A-FIFO-2 318 and B-FIFO-2 338. In this embodiment, the A-FIFO-2 318 and B-FIFO-2 338 reading state machine-controlling logic 320 is a combined state machine, handling both those particular FIFO's at once.

Re-initializing the FIFO's, also called AINIT'ING (asynchronous initialization) must be done in a coordinated manner to avoid adding additional misalignment to the A and B data streams. In this embodiment, an AINIT may be requested from errors detected in either the reading logic or in the writing logic, but the reading logic controls the AINIT process. Errors detected by the writing logic in 312 or 332 or 316 or 336 will enter state 602. In state 602, a "write AINIT request" signal is asserted and that particular FIFO's write enable is de-asserted to stop writing that particular FIFO. Sometime later, the "write AINIT request" signal will be recognized by the reading logic in the appropriate one of 316 or 336 or 320 corresponding to the particular FIFO, which entered state 602. That reading logic will enter state 608, assert a "read AINIT request" signal and de-assert that same particular FIFO's read enable to stop reading that same particular FIFO. This one FIFO is now ready to be re-initialized, but since the A and B data streams contain portions of the same packet, if A-FIFO-1 314 needs an AINIT, then B-FIFO-1 334 also requires an AINIT. Similarly, if B-FIFO-1 334 need an AINIT, then A-FIFO-1 314 requires an AINIT. Similarly again, if A-FIFO-2 318 needs an AINIT, then B-FIFO-2 338 requires an AINIT. Lastly if B-FIFO-2 338 needs an AINIT, then A-FIFO-2 318 requires an AINIT. These pairs must also be re-initialized in a semi-synchronous manner so both FIFO's in the particular pair re-enter their respective "normal write" states in the same clock cycle. Errors detected by the reading logic in 316 or 336 or 320 will enter state 608. In state 608, a "read AINIT request" signal is asserted and that particular FIFO's read enable is de-asserted to stop reading that particular FIFO (or in the case of 320, both FIFO's). Sometime later, the "read AINIT request" signal will be recognized by the writing logic in the appropriate pair of 312 and 332 or 316 and 336 corresponding to the particular FIFO, which entered state 608. That writing logic will enter state 602, assert a "write AINIT request" signal and de-assert that same particular FIFO's write enable to stop writing that same particular FIFO. Sometime later also, the "read AINIT request" signal will be recognized by both the reading and writing logic of the paired FIFO. That is, if A-FIFO-1 314's reading logic element 316 asserts its individual "read AINIT request" signal, then B-FIFO-1 334's writing and reading logic elements 332 and 336 will enter states 602 and 608 respectively and assert their individual "write AINIT request" and "read AINIT request" signals, and stop writing and reading B-FIFO-1 334. Likewise, if B-FIFO-1's reading logic element 336's "read AINIT request" signal is asserted, both A-FIFO-1 and B-FIFO-1 will be prepared for an AINIT process. Similarly, if A-FIFO-2 318's reading logic element 320's "read AINIT request" signal (which in this case is the same signal as B-FIFO-2's "read AINIT request") is asserted, then both A-FIFO-2 and B-FIFO-2 will be prepared for an AINIT process. Again, if B-FIFO-2 338's reading logic element 320's: read AINIT request" signal (which in this case is the same signal as A-FIFO-2's "read AINIT request") is asserted, then both A-FIFO-2 and B-FIFO-2 will be prepared for an AINIT process. As for entering states 602 and 608, it only remains to be clarified that while the initial error can be detected by either the writing logic element or the reading logic element, eventually one "read AINIT request" signal will assert, causing both the write and read logic elements for both FIFO's in the pair to enter states 602 and 608 respectively. The logic elements will stay in their respective read states 608 until all appropriate "AINIT request" signals have been asserted. At this point, the read state machines (316 and 336 or 320) advance to read state 610 where they de-assert their "read AINIT request" signals and assert the particular FIFO AINIT signal. The AINIT signal asserts the full and empty signals of the FIFO and resets the read and write pointers 414 and 412 respectively and resets the read and write counters, which are indicators of FIFO fullness 416. Sometimes later the write state machines (312 and 332 or 316 and 336 recognize their particular AINIT signal as asserted and advance to write state 604 where their individual "write AINIT request" signal is de-asserted. In the write state machine in logic element 316 only, a special new signal is asserted, "FIFO2 AINIT request". When errors are detected in the reading or writing logic around the pair of FIFO-1, only the pair of FIFO-1 are re-initialized. But when errors are detected in the reading or writing logic around the pair of FIFO-2, then the FIFO-2 pair and the FIFO-1 pair must be re-initialized, though the FIFO-2 logic only needs to request the FIFO-1 pair to AINIT, it does not have to happen synchronously. This described in the optical receiver logic error detection section and occurs when the FIFO-1 pair are cleared slightly before the error event ends, leaving some additional erroneous data and misalignment in the FIFO-1 pair. This cannot be detected prior to the FIFO-2 reading logic; hence anytime FIFO-2 requires clearing, it is possible that FIFO-1 requires clearing as well. In this embodiment, using the writing logic element 316 entering write state 604, an additional "FIFO-2 AINIT request" signal will be asserted and recognized as just one more of the set of appropriate AINIT request signals in the pair of FIFO's, A-FIFO-1 314 and B-FIFO-1 334, except that this AINIT request can be ignored if the FIFO-1 pair of FIFO's is already in the middle of an AINIT process. Sometime later, those read state machines which are in state 610 will recognize that all their appropriate AINIT request signals have been de-asserted. These read state machines will advance to read state 612 and de-assert their particular FIFO's AINIT signal. In the next cycle, these state machines will advance to normal operation states, preparing to read their particular FIFO again, which is currently empty. Sometime later, those write state machines which are in state 604 will recognize their particular FIFO's AINIT signal is off and will advance to write state 606, where the writing logic element 316 that controls A-FIFO-2 318 will de-assert the "FIFO-2 AINIT request" signal. The remaining write state machines take no action in this state. In the next cycle, these state machines will advance to normal operation states, and start writing their particular FIFO's again. This embodiment controls the AINIT process from the reading logic; hence the read logic exits the error states prior to the write logic. An additional "startup" state exists in the normal read state machine states to allow the FIFO's to get approximately halfway full prior to the first read, thus starting the FIFO fullness indicator 416 roughly halfway between full and empty. It is readily apparent that the AINIT process could also have been controlled by the writing logic. In that case, the writing logic would exit the error states prior to the read logic and care (analysis and possible additional write states) would need to be taken to ensure the FIFO's could not get full prior to the first read. An important side note for this embodiment is that when errors are detected on the optical receive logic FIFO-2 writing logic elements 316 or 336, entering write state 602, and the read logic elements 320 recognizes the "write AINIT request" signal, the read logic element 320 notes the signal, but keeps reading until one of A-FIFO-2 or B-FIFO-2 is empty (since the write side has stopped writing at the error). In this manner, it is possible a current good packet will successfully be processed. The read logic element 320 will advance to read state 608 to begin the AINIT process after at least one of the FIFO's has no more data to send. It only remains to be said that one error, invalid states of one or more of the state machines can occur while the state machines are in any particular state. This is one of the detected errors described above that cause the write or read state machines to enter states 602 or 608 respectively, but the various "AINIT request" signals must also be forced off. These signals cross from logic controlled by one clock to logic controlled by another clock. To do so, they are latched (stored through a clock cycle) three times, once on the sending clock and twice on the receiving clock to reduce metastability effects. Because of this, they stay on longer than typical signals and must be forced off in order for this embodiment of the coordinated FIFO re-initialization to work properly.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of communicating a plurality of parallel data packets from a first parallel data bus to a second parallel data bus, comprising the steps of:
   a. separating each of the plurality of parallel data packets into a first portion and a second portion;
   b. converting each of the first portions into a first serial data stream and converting each of the second portions into a second serial data stream;
   c. transmitting the first serial data stream over a first serial data channel and transmitting the second serial data stream over a second serial data channel;
   d. converting the first serial data stream into a plurality of first received portions and converting the second serial data stream into a plurality of second received portions;
   e. combining selected first received portions with corresponding selected second received portions so as to regenerate the plurality of parallel data packets;
   f. receiving parallel data packets using a plurality of FIFO's, each FIFO having a read side and a write side
   g. entering a first write state when either a write side error signal or a read asynchronous initialization request signal is asserted and performing the following operations:
      i. writing to all of the FIFO's is stopped; and
      ii. a write asynchronous initialization request signal is asserted;
   h. exiting the first write state when an initialization signal is asserted,
   i. entering a second write state from the first write state and de-asserting a write side initialization request signal;
   j. exiting the second write state when the initialization signal is de-asserted;
   k. entering a third write state from the second write state and resuming normal operations;
   l. entering a first read state when either a read side error signal or the write side initialization request signal is asserted, and performing the following operations:
      i. reading from all of the FIFO's is stopped; and
      ii. the read asynchronous initialization request signal is asserted;
   m. exiting the first read state when all of the initialization request signals are asserted,
   n. entering a second read state from the first read state and performing the following operations:
      i. asserting the initialization signal; and
      ii. de-asserting a read initialization signal;
   o. exiting the second read state when all of the initialization request signals are de-asserted; and
   p. entering a third read state from the second read state and de-asserting the initialization signal.

2. The method of claim 1, wherein the first serial data channel and the second serial data channel each comprise an optical serial data link.

3. The method of claim 1, wherein the plurality of FIFO's include a first A-FIFO, a second A-FIFO, a first B-FIFO and a second B-FIFO, the method further comprising the step of executing the following operation while in the second write state of a selected one of the second A-FIFO and the second B-FIFO: asserting an additional initialization request signal from a selected one of the second A-FIFO and the second B-FIFO to the first A-FIFO and the first B-FIFO.

4. The method of claim 3, further comprising the step of executing the following operation while in the third write state of a selected one of the second A-FIFO and the second B-FIFO: de-asserting the additional initialization request signal in the selected one of the second A-FIFO and the second B-FIFO.

5. The method of claim 3, wherein each of the first A-FIFO, the second A-FIFO, the first B-FIFO and the second B-FIFO includes a FIFO fullness indicator indicating a FIFO fullness and further comprising the step of consuming a first predetermined character when the FIFO fullness indicator for a FIFO indicates that the FIFO fullness is greater than a first predetermined threshold.

6. The method of claim 5, further comprising the step of generating a second predetermined character when the FIFO fullness indicator for a FIFO indicates that the FIFO fullness is less than a second predetermined threshold.

7. The method of claim 6, wherein the second predetermined character comprises a unique character that is recognized only as a generated character.

8. An apparatus for transmitting a plurality of data words from a first parallel data bus to a second parallel data bus, comprising:
   a. a first serializer, in data communication with a first parallel bus, that transforms a first portion of each data word into a first serial data stream;
   b. a second serializer, in data communication with a second parallel bus, that transforms a second portion, different from the first portion, of each data word into a second serial data stream;
   c. a first serial data channel, in data communication with the first serializer, upon which the first serial data stream is transmitted;
   d. a second serial data channel, in data communication with the second serializer, upon which the second serial data stream may be transmitted;
   e. a first de-serializer, in data communication with the first serial data channel, that transforms the first serial data stream into a plurality of first parallel data units, each first parallel data unit being identical to a corresponding first portion of a data word;
   f. a second de-serializer, in data communication with the second serial data channel, that transforms the second serial data stream into a plurality of second parallel data units, each second parallel data unit being identical to a corresponding second portion of a data word; and
   g. a receiver element that receives the first parallel data units from the first de-serializer and the second parallel data units from the second de-serializer and that assembles corresponding ones of the first parallel data units and the second parallel data units into corresponding data words and that transmits the corresponding data words to the second parallel data bus, the receiver element including:
      i. a first A-FIFO that is capable of receiving packets of parallel data from the first de-serializer;

ii. a first B-FIFO that is capable of receiving packets of parallel data from the second de-serializer;

iii. a second A-FIFO that is capable of receiving packets of parallel data from the first A-FIFO;

iv. a second B-FIFO that is capable of receiving packets of parallel data from the first B-FIFO; and v. a logic element that concatenates packets of parallel data from the second A-FIFO with packets of parallel data from the second B-FIFO to generate a data word and that transmits the data word to the second parallel data bus.

9. The apparatus of claim 8, wherein the first A-FIFO has a write side and wherein the write side of the first A-FIFO is clocked by an a-channel clock extracted from the first de-serializer.

10. The apparatus of claim 8, wherein the first B-FIFO has a write side and wherein the write side of the first B-FIFO is clocked by a b-channel clock extracted from the second de-serializer.

11. The apparatus of claim 8, wherein the first A-FIFO has a read side and the first B-FIFO has a read side and wherein the read sides of both the first A-FIFO and the first B-FIFO are clocked by a common reference clock.

12. The apparatus of claim 8, wherein the second A-FIFO and the second B-FIFO each have a write side and wherein the write sides of both the second A-FIFO and the second B-FIFO are clocked by a common reference clock.

13. The apparatus of claim 8, wherein the second A-FIFO and the second B-FIFO each have a read side and wherein the read sides of both the second A-FIFO and the second B-FIFO are clocked by a common system clock.

14. The apparatus of claim 8, further comprising a error recovery logic element that embodies a state machine that includes the following elements:

a. a first write state, which is entered when either a write side error signal or a read asynchronous initialization request signal is asserted, which exited when an initialization signal is asserted, and in which the following operations are performed:
  i. writing to all of the FIFO's is stopped; and
  ii. a write asynchronous initialization request signal is asserted;

b. a second write state, which is entered from the first write state, which is exited when the initialization signal is de-asserted, and in which a write side initialization request signal is de-asserted;

c. a third write state, which entered from the second write state and in which normal operations are resumed;

d. a first read state which is entered when either read side error signal or the write side initialization request signal is asserted, which is exited when all of the initialization request signals are asserted, and in which the following operations are performed:

i. reading from all of the FIFO's is stopped; and
  ii. the read asynchronous initialization request signal is asserted;

e. a second read state, which is entered from the first read state, which is exited when all of the initialization request signals are de-asserted, and in which the following operations are performed:
  i. the initialization signal is asserted; and
  ii. the read asynchronous initialization request signal is de-asserted; and f a third read state, which is entered from the second read state and in which the initialization signal is de-asserted.

15. The apparatus of claim 14, wherein the following operation is further performed in the second write state: asserting an additional request signal from a selected one of the second A-FIFO and the second B-FIFO to the first A-FIFO and the first B-FIFO.

16. The apparatus of claim 14, wherein the following operation is further performed in the third write state: de-asserting the additional initialization request signal in the second FIFO.

17. The apparatus of claim 8, wherein each of the A-FIFO's and B-FIFO'S include a FIFO fullness indicator, that indicates a FIFO fullness, and wherein each of the A-FIFO's and B-FIFO's includes a first logic element that consumes a first predetermined character when the FIFO fullness indicator for a FIFO indicates that the FIFO fullness is greater than a first predetermined threshold.

18. The apparatus of claim 17, wherein each of the first A-FIFO, the second A-FIFO, the first B-FIFO and the second B-FIFO includes a second logic element that generates a second predetermined character when the FIFO fullness indicator for a FIFO indicates that the FIFO fullness is less than a second predetermined threshold.

19. The apparatus of claim 18, further comprising a circuit that recognizes a fill character anywhere in an incoming data stream and that removes the fill character from the incoming data stream.

20. The apparatus of claim 17, wherein the second predetermined character comprises a unique character that is recognized only as a generated character.

21. The apparatus of claim 8, further comprising:
a. a central FIFO; and
b a read-side logic element that detects at least one of the following: a lack of a sync character, or an irregularity in a clock frequency.

22. The apparatus of claim 8, further comprising a circuit element that periodically and contemporaneously adds to both the first serial data stream and the second serial data stream an alignment character.

* * * * *